United States Patent
Ceder et al.

(10) Patent No.: US 9,780,363 B2
(45) Date of Patent: Oct. 3, 2017

(54) HIGH-CAPACITY POSITIVE ELECTRODE ACTIVE MATERIAL

(71) Applicant: Massachusetts Institute of Technology, Cambridge, MA (US)

(72) Inventors: Gerbrand Ceder, Wellesley, MA (US); Jinhyuk Lee, Cambridge, MA (US); Alexander Urban, Somerville, MA (US); Xin Li, Brookline, MA (US); Sangtae Kim, Cambridge, MA (US); Geoffroy Hautier, Brussels (BE)

(73) Assignee: Massachusetts Institute of Technology, Cambridge, MA (US)

( * ) Notice: Subject to any disclaimer, the term of this patent is extended or adjusted under 35 U.S.C. 154(b) by 353 days.

(21) Appl. No.: 14/044,596

(22) Filed: Oct. 2, 2013

(65) Prior Publication Data

US 2014/0099549 A1 Apr. 10, 2014

Related U.S. Application Data

(60) Provisional application No. 61/708,963, filed on Oct. 2, 2012.

(51) Int. Cl.
| | |
|---|---|
| *H01M 4/36* | (2006.01) |
| *H01M 4/485* | (2010.01) |
| *H01M 4/525* | (2010.01) |
| *H01M 4/131* | (2010.01) |
| *H01M 4/62* | (2006.01) |

(52) U.S. Cl.
CPC ............ *H01M 4/366* (2013.01); *H01M 4/131* (2013.01); *H01M 4/485* (2013.01); *H01M 4/525* (2013.01); *H01M 4/624* (2013.01); *H01M 4/625* (2013.01)

(58) Field of Classification Search
None
See application file for complete search history.

(56) References Cited

U.S. PATENT DOCUMENTS

| | | |
|---|---|---|
| 4,049,891 A | 9/1977 | Hong et al. |
| 4,302,518 A | 11/1981 | Goodenough et al. |
| 4,357,215 A | 11/1982 | Goodenough et al. |

(Continued)

FOREIGN PATENT DOCUMENTS

| | | |
|---|---|---|
| CN | 101997109 | 3/2011 |
| WO | WO-2014/055665 A2 | 4/2014 |

OTHER PUBLICATIONS

Armstrong, A. R. et al., Demonstrating Oxygen Loss and Associated Structural Reorganization in the Lithium Battery Cathode Li[Ni$_{0.2}$Li$_{0.2}$Mn$_{0.6}$]O$_2$, J. Am. Chem. Soc., 128:8694-8698 (2006).

(Continued)

*Primary Examiner* — Alix Eggerding
(74) *Attorney, Agent, or Firm* — Choate, Hall & Stewart LLP; William R. Haulbrook, JD; Alexander D. Augst, JD

(57) ABSTRACT

This disclosure provides a positive electrode active lithium-excess metal oxide with composition Li$_x$M$_y$O$_2$ (0.6≤y≤0.85 and 0≤x+y≤2) for a lithium secondary battery with a high reversible capacity that is insensitive with respect to cation-disorder. The material exhibits a high capacity without the requirement of overcharge during the first cycles.

6 Claims, 6 Drawing Sheets

(56) References Cited

U.S. PATENT DOCUMENTS

| | | | |
|---|---|---|---|
| 4,507,371 | A | 3/1985 | Thackeray et al. |
| 5,910,382 | A | 6/1999 | Goodenough et al. |
| 6,391,493 | B1 | 5/2002 | Goodenough et al. |
| 6,514,640 | B1 | 2/2003 | Armand et al. |
| 7,622,224 | B2 | 11/2009 | Si Larbi Jouanneau et al. |
| 8,399,130 | B2 | 3/2013 | Ceder et al. |
| 2004/0091779 | A1* | 5/2004 | Kang .................. C01G 53/006 429/231.1 |
| 2005/0136331 | A1 | 6/2005 | Jouanneau-Si Larbi et al. |
| 2010/0143799 | A1 | 6/2010 | Park |
| 2010/0143803 | A1 | 6/2010 | Park |
| 2010/0264381 | A1 | 10/2010 | Ceder et al. |
| 2011/0042609 | A1* | 2/2011 | Park ...................... H01M 4/366 252/182.1 |
| 2011/0076556 | A1 | 3/2011 | Karthikeyan et al. |
| 2011/0111298 | A1 | 5/2011 | Lopez et al. |
| 2011/0294020 | A1 | 12/2011 | Kim et al. |
| 2012/0028134 | A1 | 2/2012 | Kim et al. |
| 2012/0045694 | A1* | 2/2012 | Park ................... C01G 45/1228 429/220 |
| 2013/0273425 | A1 | 10/2013 | Ceder et al. |
| 2014/0141329 | A1 | 5/2014 | Ceder et al. |
| 2014/0246619 | A1 | 9/2014 | Hautier et al. |

OTHER PUBLICATIONS

Capitelli, F. et al., New Monodisphosphate $Li_gCr_3(P_2O_7)_3(PO_4)_2$: X-Ray Crystal Structure and Vibrational Spectroscopy, Z. Kristallographie, 222:521-526 (2007).

Choi, J. and Manthiram, A., Role of Chemical and Structural Stabilities on the Electrochemical Properties of Layered $LiNi_{1/3}Mn_{1/3}Co_{1/3}O_2$ Cathodes, Journal of the Electrochemical Society, 152(9):A1714-A1718 (2005).

Delmas, C. et al., On the behavior of the $Li_xNiO_2$ system: an electrochemical and structural overview, Journal of Power Sources 68:120-125 (1997).

Falah, C. et al., Crystal Structure and Cation Transport Properties of the Layered Monodiphosphates $Rb_6Bi_4(PO_4)_2(P_2O_7)_3$, Journal of Solid State Chemistry, 173:342-349 (2003).

International Search Report for PCT/US13/63094, 4 pages (Apr. 21, 2014).

Ji, F. et al., Hydrothermal Synthesis of $Li_9Fe_3(P_2O_7)_3(PO_4)_2$ Nanoparticles and Their Photocatalytic Properties under Visible-Light Illumination, Applied Materials & Interfaces, 2(6):1674-1678 (2010).

Kang, K. et al., Electrodes with High Power and High Capacity for Rechargeable Lithium Batteries, Science, 311:977-980 (2006).

Kuang, Q. et al., Layered Monodiphosphate $Li_9V_3(P_2O_7)_3(PO_4)_2$: A Novel Cathode Material for Lithium-Ion Batteries, Electrochimica Acta, 56:2201-2205 (2011).

Kuang, Q. et al., Synthesis, Structure, Electronic, Ionic and Magnetic Properties of $Li_9V_3(P_2O_7)_3(PO_4)_2$ Cathode Material for Li-Ion Batteries, The Journal of Physical Chemistry C, 115:8422-8429 (2011).

Liu, X. et al., the Layered Monodiphosphate $Li_9Ga_3(P_2O_7)_3(PO_4)_2$ Refined from X-Ray Powder Data, Acta Crystallographica, E62:i112-i113 (2006).

Lyu, Y. et al., Atomic insight into electrochemical inactivity of lithium chromate ($LiCrO_2$): Irreversible migration of chromium into lithium layers in surface regions, Journal of Power Sources. 273:1218-1225 (2015).

Ohzuku, T. and Makimura, Y., Layered Lithium Insertion Material of $LiNi_{1/2}Mn_{1/2}O_2$: A Possible Alternative to $LiCoO_2$ for Advanced Lithium-Ion Batteries, Chemistry Letters, 30:744:745 (2001).

Park, K-S. et al., $LifeO_2$-Incorporated $Li_2MoO_3$ as a Cathode Additive for Lithium-Ion Battery Safety, Chem. Mater., 24:2673-2683 (2012).

Poisson, S. et al., Crystal Structure and Cation Transport Properties of the Layered Monodiphosphates: $Li_9M_3(P_2O_7)(PO_4)_2$ (M = Al, Ga, Cr, Fe), Journal of Solid State Chemistry, 138:32-40 (1998).

Thackeray, J. M. et al., $Li_2MnO_3$-stabilized $LiMO_2$ (M = Mn, Ni, Co) electrodes for lithium-ion batteries, J. Mater. Chem., 17(30):3112-3125 (2007).

Wang, H. et al., TEM Study of Electrochemical Cycling-Induced Damage and Disorder in $LiCoO_2$ Cathodes for Rechargeable Lithium Batteries, Journal of the Electrochemical Society, 146(2):473-480 (1999).

Whittingham, M. S., Electrical Energy Storage and Intercalation Chemistry, Science, 192:1126-1127 (1976).

Whittingham, M. S., Lithium Batteries and Cathode Materials, Chemcial Reviews, 104(10):4271-4301 (2004).

Xu, J. et al., Preparation and Electrochemical Properties of Cr-Doped $Li_9V_3(P_2O_7)_3(PO_4)_2$ as Cathode Materials for Lithium-Ion Batteries, Electrochimica Acta, vol. 56, Issue 18, 6562-6567 (2011).

Zhang, X. et al., Minimization of the cation mixing in $Li_{1+x}(NMC)_{1-x}O_2$ as cathode material, Journal of Power Sources, 195:1292-1301 (2010).

Lee, J. et al., Unlocking the Potential of Cation-Disordered Oxides for Rechargeable Lithium Batteries, Science, 343:519-522 (2014).

Yu, X., et al., Understanding the Rate Capability of High-Energy-Density Li-Rich Layers $Li_{1.2}Ni_{0.15}Co_{0.1}Mn_{0.55}O_2$ Cathode Materials, Advanced Energy Materials, 8 pages, (2013).

James, A. C. W. P. and Goodenough, J. B., Structure and Bonding in $Li_2MoO_3$ and $Li_{2-x}MoO_3 (0 \leq x \leq 1.7)$, Journal of Solid State Chemistry 76:87-96 (1988).

Jones, C. D. W. et al., Structure and electrochemistry of $Li_xCr_yCo_{1-y}O_2$, Solid State Ionics, 68:65-69 (1994).

Zhang, L. et al., Novel Layered Li—Cr—Ti—O Cathode Materials Related to the $LiCrO_2$-$Li_2Tio_3$ Solid Solution, Journal of the Electrochemical Society, 150(5):A601-A607 (2003).

* cited by examiner

HIGH-CAPACITY POSITIVE ELECTRODE ACTIVE MATERIAL

CROSS REFERENCE TO RELATED APPLICATIONS

The present application claims priority to U.S. provisional patent application No. 61/708,963, filed Oct. 2, 2012, the entire contents of which are hereby incorporated by reference herein.

TECHNICAL FIELD

The present disclosure relates to a discharge-positive electrode (also referred to as cathode) for a lithium secondary battery that exhibits a large reversible capacity and does not require overcharge (the charging beyond the theoretical capacity limit) during the first cycles, and a synthesis route for producing the same.

BACKGROUND

Li Battery Cathode Materials:

The positive electrode (cathode) material is the limiting factor in the production of high capacity and high energy density lithium ion batteries. An important class of cathode materials for secondary lithium batteries is constituted by rock-salt type layered lithium metal oxides of the general composition $LiMO_2$, where M is a metallic species or a mixture of several such. In such layered oxides, every second plane in <111> direction (from F-3m cubic system) contains alternating lithium cations or cations of species M (M. S. Whittingham, *Science* 192 (1976) 1126-1127; M. S. Whittingham, *Chemical Reviews* 104 (2004) 4271-4302). It has been typical in the field of batteries to look for well-ordered layered cathodes, in which the Li and M cations are well separated in distinct (111) layers. For example, capacity degrading in $LiNiO_2$ can be attributed to the migration of nickel cations to the lithium layer (C. Delmas et al., *Journal of Power Sources* 68 (1997) 120-125). Introducing Mn to the compound improves its layeredness and results in significantly better capacity retention (K. Kang et al., *Science* 311 (2006) 977-980). Similarly, cation mixing is believed to have a strong negative impact on the electrochemical performance of $Li(Li,Ni,Mn,Co)O_2$ (X. Zhang et al., *J. Power Sources* 195 (2010) 1292-1301). The capacity of most well-ordered layered cathode materials has been limited to 150-180 mAh/g which corresponds to ≈0.5 to 0.65 Li ions per $LiMO_2$ formula unit (T. Ohzuku, Y. Makimura, *Chemistry Letters* 30 (2001) 744-745; J. Choi, A. Manthiram, *J. Electrochem. Soc.* 152 (2005) A1714-A1718). To achieve higher capacity, complex overcharging schemes have been developed, but these are difficult to implement in the manufacturing of batteries. For example, some $Li(Li,Ni,Co,Mn)O_2$ compounds are overcharged in the first cycle at a voltage above 4.7 V in order to release oxygen, and achieve a higher capacity in the subsequent cycles (M. M. Thackeray et al., *J. Mater. Chem.* 17 (2007) 3112-3125; A. R. Armstrong et al., *J. Am. Chem. Soc.* 128 (2006) 8694-8698). But this overcharge process is more expensive to implement and leads to cathode materials with limited long-term stability as well as reduced charge/discharge rate capability. Thus, overcharging may lead to oxygen evolution and poses a potential safety risk, and adds cost and complications to battery manufacturing.

SUMMARY

Described herein, among other things, is a discharge-positive electrode material for a lithium secondary battery that exhibits a large reversible capacity of more than 150 mAh/g. In some embodiments, the material is a (rock-salt type) lithium metal oxide with composition $Li_xM_yO_2$ with $0.6 \leq y \leq 0.85$ and $0 \leq x+y \leq 2$, where M is a mixture of metallic elements including at least one of Al, Ti, V, Cr, Mn, Fe, Co, Ni, Cu, Zn, Zr, Nb, Mo, Ru, Sn, Sb. The material is capable of cation mixing. In contrast to existing lithium excess metal oxide active materials, the material presented here does not require overcharge during the first cycles.

In some embodiments, a provided material is a lithium metal oxide characterized by a general formula $Li_xM_yO_2$ wherein $0.6 \leq y \leq 0.85$, $0 \leq x+y \leq 2$, and M being one or more of a metallic species chosen from the group consisting of Al, Ti, V, Cr, Mn, Fe, Co, Ni, Cu, Zn, Zr, Nb, Mo, Ru, Sn and Sb; said oxide, when characterized by XRD, showing a. a peak whose intensity I' is the largest in the range 16-22 degrees 2θ, such as the (003) peak in structures with space group R-3m, and the (001) peak in structures with space group P-3m1, and b. a peak whose intensity I" is the largest in the range 42-46 degrees 2θ, such as the (104) peak in structures with space group R-3m, and the (011) peak in structures with space group P-3m1;

the oxide characterized in that subjecting said oxide to at least one lithium ion extraction-insertion cycle results in a reduction of the ratio of I'/I".

In some embodiments, the intensity I' is reduced by at least 10% (e.g., at least 10%, 15%, 20%, 25%, 30%, 35%, 40%, 45%, or 50%) upon subjecting the oxide to at least one lithium ion extraction-insertion cycle. In some embodiments, the intensity I' is reduced by at least 10% (e.g., at least 10%, 15%, 20%, 25%, 30%, 35%, 40%, 45%, or 50%) upon subjecting the oxide to ten lithium ion extraction-insertion cycles. In some embodiments, the ratio I'/I" is reduced by at least 10% (e.g., at least 10%, 15%, 20%, 25%, 30%, 35%, 40%, 45%, or 50%) upon subjecting the oxide to at least one lithium ion extraction-insertion cycle. In some embodiments, the ratio I'/I" is reduced by at least 10% (e.g., at least 10%, 15%, 20%, 25%, 30%, 35%, 40%, 45%, or 50%) upon subjecting the oxide to ten lithium ion extraction-insertion cycles.

In some embodiments, the distribution of cations becomes more random and/or more disordered among cation layers upon subjecting an oxide to at least one lithium ion extraction-insertion cycle. In some embodiments, the distribution of cations becomes more uniformly distributed over the cation layers (as opposed to strict segregation into Li and M layers) upon subjecting an oxide to at least one lithium ion extraction-insertion cycle.

In some embodiments, a provided material is a lithium metal oxide characterized by a general formula $Li_xM_yO_2$ wherein $0.6 \leq y \leq 0.85$, $0 \leq x+y \leq 2$, and M being one or more of a metallic species chosen from the group consisting of Al, Ti, V, Cr, Mn, Fe, Co, Ni, Cu, Zn, Zr, Nb, Mo, Ru, Sn and Sb; said oxide, as synthesized, showing a random or partially random distribution of Li cations and M cations in the oxygen arrangement of the rock-salt structure, as measurable by XRD. In some embodiments, such oxides, when characterized by XRD, show a peak whose intensity I' is the largest in the range 16-22 degrees 2θ, and a peak whose intensity I" is the largest in the range 42-46 degrees 2θ. In some embodiments, is essentially zero, so that I'/I"≤0.01.

In certain embodiments of provided oxides, the absence of oxygen oxidation is characterized by a first charge capacity of at least 150 mAh/g when charging at room temperature at C/20 rate which is the rate to potentially utilize the full theoretical capacity $C_{max}$ in 20 hours.

In certain embodiments of provided oxides, the distance between any two neighboring oxygen planes in any lattice direction is less than 2.55 Å upon subjecting the oxide to at least one lithium insertion-extraction cycle.

In certain embodiments, an oxide is $Li_{1+x}Mo_{2x}Cr_{1-3x}O_2$, wherein $0.15<x<0.333$. In certain embodiments, an oxide is $Li_{1+x}Ni_{(2-4x)/3}M_{(1+x)/4}O_2$, wherein $0.15<x\leq0.3$ and M is Sb or Nb. In certain embodiments, an oxide is $Li_{1+x}Ni_{(3-5x)/4}Mo_{(1+x)/4}O_2$, wherein $0.15<x\leq0.3$. In some embodiments, an oxide is $Li_{1+x}Ru_{2x}M_{1-3x}O_2$, wherein $0.15<x<0.333$ and M is Co, Ni, or Fe. In certain embodiments, an oxide is $Li_{1+x}Fe_{1-y}Nb_yO_2$, wherein $0.15<x\leq0.3$ and $0<y\leq0.3$. In some embodiments, an oxide is $Li(Li_{0.233}Mo_{0.467}Cr_{0.3})O_2$.

In some embodiments, an oxide has a substoichiometric amount of lithium. In certain embodiments, an oxide has the formula $Li_{((4-x)/3)-w}(Mo_{2-2x)/3}Cr_x)O_2$, wherein:

$0<x\leq0.5$; and $0\leq w\leq0.2$;

wherein w represents a lithium deficiency. In some embodiments, an oxide has the formula $Li_{(1.233-w)}Mo_{0.467}Cr_{0.3}O_2$.

In some embodiments, the present disclosure provides an electrode comprising at least one oxide disclosed herein. In some embodiments, the present disclosure provides a coated electrode material comprising at least one oxide disclosed herein. In certain embodiments, a coated electrode material has a coating comprising a member selected from the group consisting of carbon, MgO, $Al_2O_3$, $SiO_2$, $TiO_2$, ZnO, $SnO_2$, $ZrO_2$, $Li_2O$-$2B_2O_3$ glass, phosphates, and combinations thereof. In some embodiments, a coating comprises a phosphate is selected from the group consisting of $AlPO_4$, $Li_4P_2O_7$, and $Li_3PO_4$. In some embodiments, a coating comprises carbon.

In some embodiments, a provided electrode composition comprises carbon black, a binder, and a coated electrode material described herein.

In certain embodiments, the present disclosure provides methods of preparing $Li_{1+x}Mo_{2x}Cr_{1-3x}O_2$, wherein $0.15<x<0.333$, the method comprising contacting precursors $Li_2CO_3$, $MoO_2$, and $Cr_3(OH)_2(OOCCH_3)_7$ at an elevated temperature. In some embodiments, $Li(Li_{(1-x)/3}Mo_{(2-2x)/3}Cr_x)O_2$ is $Li(Li_{0.233}Mo_{0.467}Cr_{0.3})O_2$. In certain embodiments, the elevated temperature is from about 800° C. to 1200° C. In certain embodiments, the elevated temperature is from about 800° C. to 1000° C. In some embodiments, the methods comprise milling the precursors. In some embodiments, the methods comprise dispersing the precursors in a suitable solvent prior to milling, and drying the resulting mixture.

Without wishing to be bound by any particular theory, it is believed that in some embodiments an amount of lithium may be lost during synthesis of certain oxides. For example, in some embodiments of an oxide such as $Li_{1.233}Mo_{0.467}Cr_{0.3}O_2$, wherein the formula represents theoretical stoichiometry, the experimental stoichiometry can be about $Li_{1.211}Mo_{0.467}Cr_{0.3}O_2$. In some embodiments, the provided methods utilize $Li_2CO_3$ in excess of the stoichiometric amount needed to produce the desired final compound.

In certain embodiments, the present disclosure provides methods of coating $Li_{1+x}Mo_{2x}Cr_{1-3x}O_2$, wherein $0.15<x<0.333$, the method comprising contacting a suitable coating material with $Li_{1+x}Mo_{2x}Cr_{1-3x}O_2$ at an elevated temperature. In some embodiments, the method comprises milling the suitable coating material with $Li(Li_{(1-x)/3}Mo_{(2-2x)/3}Cr_x)O_2$. In certain embodiments, the weight ratio of $Li(Li_{(1-x)/3}Mo_{(2-2x)/3}Cr_x)O_2$ to the suitable coating material is from about 90:10 to about 70:30 (e.g., about 90:10, 85:15, 80:20, 75:25, or 70:30). In some embodiments, the elevated temperature is from about 400° C. to about 800° C. In certain embodiments, the suitable coating material is carbon. In some embodiments, the suitable coating material is a carbon precursor. In some embodiments, the carbon precursor converts to carbon at an elevated temperature. In some embodiments, the carbon precursor is a carbohydrate. In some embodiments, the carbon precursor is sucrose.

The present disclosure also provides lithium batteries and lithium-ion cells comprising an electrode material described herein. The present disclosure further provides devices comprising such lithium batteries and lithium-ion cells. In some embodiments, a device is a portable electronic device, an automobile, or an energy storage system.

Other features, objects, and advantages of the present disclosure are apparent in the detailed description that follows. It should be understood, however, that the detailed description, while indicating embodiments of the present disclosure, is given by way of illustration only, not limitation. Various changes and modifications within the scope of the disclosure will become apparent to those skilled in the art from the detailed description.

DETAILED DESCRIPTION OF CERTAIN EMBODIMENTS

In the present disclosure, high capacity cathode materials were prepared that do not require an overcharge in the first cycles. In addition, contrary to common belief in the battery field, it is shown that well-ordered cathode materials are not needed, and that actually, highly disordered Li-excess materials can deliver very high reversible Li storage capacity.

Figure 1:
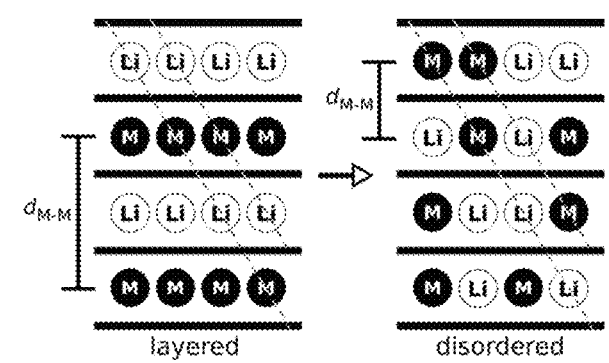
FIG. 1: Schematic depiction of cation mixing. The distance $d_{M-M}$ between layers containing cation species M is approximately halved upon disordering. In XRD spectra, this effect results in a Bragg reflection at approximately two times 2θ of the layered material, and an intensity decrease of the (003) peak in O3-type oxides. The dashed lines in the figure indicate crystal planes whose stoichiometry are independent of the cation ordering. XRD signals corresponding to these planes, such as the (104) peak in O3-type oxides, can be used as a reference to quantify the layeredness of a sample.
Figure 2:
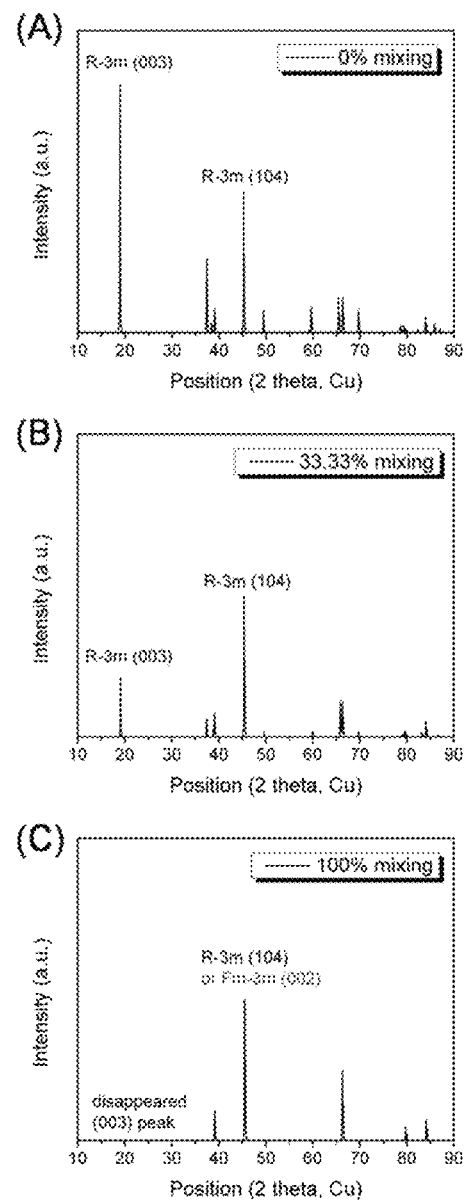
FIG. 2: X-ray diffraction pattern simulation for cation mixing in $LiCoO_2$: (A) mixing—no transition metal migration to lithium layer at all. (B) 33.33% mixing—25% of transition metal are in lithium layer while 75% are in transition metal layer. (C) 100% mixing—50% of transition metal are in lithium layers and rest (50%) are in transition metal layers. As the mixing level increases, the intensity of (003) peak decreases while that of (104) peak stays similar. At 100% mixing, there is no longer a (003) peak.

Cation Order:

The layeredness of a sample of a $LiMO_2$ compound can be experimentally quantified using powder X-ray diffraction (XRD). In well-layered materials, the distance $d_{M-M}$ between layers containing cation species M is approximately twice as large as in disordered materials (FIG. 1), and manifests itself in a Cu k-α Bragg reflection at 2θ~16-22°, such as a (003) peak in R-3m layered oxides, or a (001) peak in P-3m1 layered oxides. As used herein, "peak A" refers to a peak whose intensity I' is the largest in the range 16-22°. The intensity of peak A comes from the plane that mainly composed of metal ions that are strong x-ray scatterers. Therefore, any damage to the layered arrangement of metal ion results in the decrease of peak A's intensity, as the metal plane now becomes partially composed of weak x-ray scatterers, such as lithium ions or vacancies. There are, however, also crystal planes whose compositions are independent of the cation mixing (dashed lines in FIG. 1), such as (104) planes in R-3m layered oxides, or (011) planes in P-3m1 layered oxides, which are typically observed at 2θ~42-46°. These planes give rise to XRD peaks that are insensitive with respect to the cation ordering. As used herein, "peak B" refers to a peak whose intensity I" is the largest in the range 42-46°. Therefore, the ratio of the intensities of an ordering-sensitive XRD peak at 2θ~16-22° (peak A) and an ordering-insensitive peak at 2θ~42-46° (peak B) thus quantifies the layeredness of the sample. As an example, FIG. 2 shows how the intensity ratio between (003) peak (peak A) and (104) peak (peak B) of R-3m $LiCoO_2$ changes with cation mixing (disordering). When $LiCoO_2$ is perfectly layered (0% mixing), the ratio is high, and the high intensity coming from the (003) peak is clearly seen. However, as the cation mixing level (transition metal ions in lithium layers/transition metal ions in transition metal layers*100%) increases to 33.33%, now the intensity of the (003) peak is much weaker, while that of (104) peak is still similar. Finally, as the mixing level increases to 100% (fully cation-disordered), there is no longer (003) peak, and the XRD pattern resembles that of Fm-3m cubic disordered rocksalt materials. As described above, the intensity ratio between the peak A and peak B can be used to determine the cation mixing level (i.e. cation-disorderedness).

Capacity:

Upon charging lithium is reversibly extracted from the oxide and metal cations are oxidized

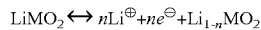

Assuming the extraction of all lithium the maximum theoretical capacity $C_{max}$ is proportional to the number of redox-available electrons n(e) per total mass of the lithiated compound m $$C_{max} = \frac{n(e)}{m}F$$

(F is Faraday's constant).

Figure 3:
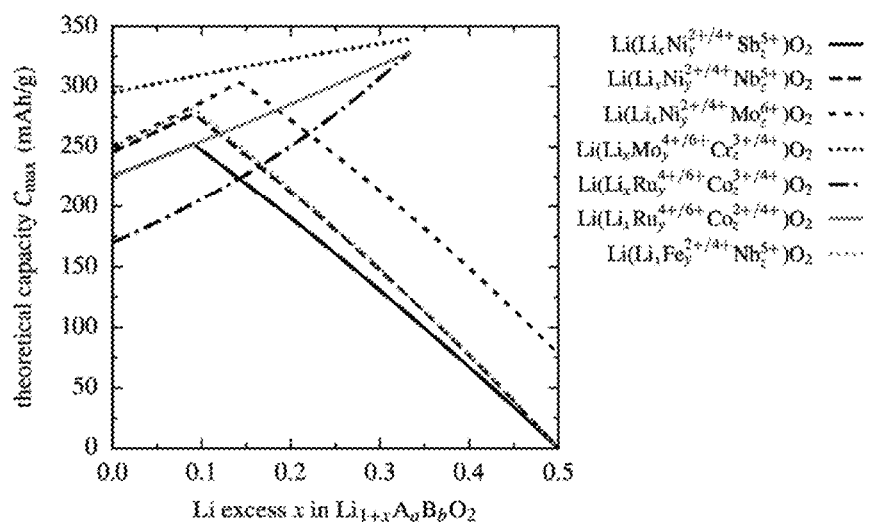
FIG. 3: Theoretical (maximum) capacity of a number of lithium metal oxides as function of the excess lithium contents. The value of the theoretical capacity $C_{max}$ was calculated as described in the text.

Note that the number of redox-active electrons is not only determined by the lithium fraction, but also depends on the accessible redox couples of species M. The theoretical capacity for a number of selected compounds of compositions $Li_xA_aB_bO_2$ is depicted in FIG. 3.

Often a high discrepancy between the theoretical capacity limit and the specific capacity of a synthesized material is observed because $C_{max}$ only provides a measure for the upper bound of the specific capacity. In contrast, the most conservative capacity estimate $C_{min}$ is determined by the number of definitely accessible lithium ions n(Li) per mass of the lithiated compound $$C_{min} = \frac{n(Li)}{m}F.$$

Figure 4:
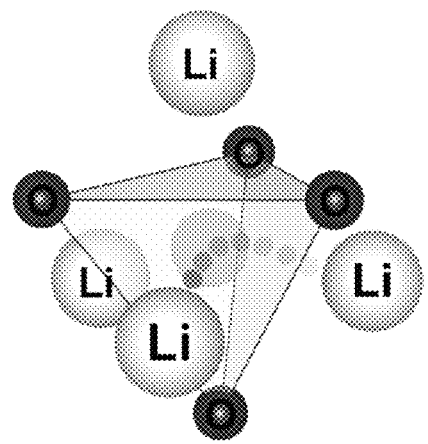
FIG. 4: Tetrahedral site in rock salt based lithium metal oxides surrounded only by lithium ions (lighter color balls). Such local lithium-rich geometries occur in compositions with excess lithium contents. Darker color balls are oxygen atoms.
Figure 5:
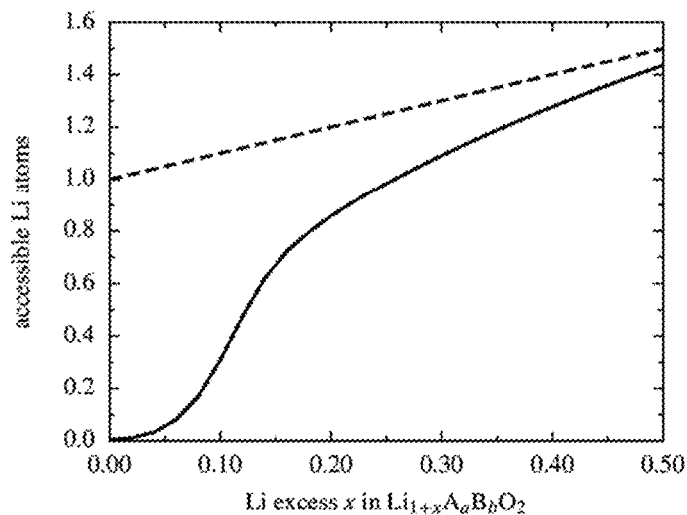
FIG. 5: Number of accessible lithium atoms per formula unit as calculated by a numerical percolation simulation (solid black line). Only lithium atoms that are part of a percolating network of stabilized tetrahedral sites contribute. The dashed line corresponds to the total number of lithium atoms in the formula unit.

Since ordered layered materials have practical capacities that are much lower than their theoretical capacities, it is clear that not all the Li ions in the material are practically accessible. For Li ions to be accessible, they have to be able to diffuse in and out of the crystal structure as that is respectively the discharge and charge process. The factors that determine the diffusion of lithium ions in layered rock-salt type lithium metal oxides are well understood [1]: the activated states for the lithium ion diffusion through the intercalation material are sites of tetrahedral geometry. The necessary energy for lithium activation, i.e., the lithium diffusion barrier, depends on (i) the oxidation state of the face sharing species of these tetrahedral sites (the higher the oxidation state, the greater the electrostatic repulsion), and (ii) the size of the tetrahedral sites, which in layered oxides is in turn mainly determined by the oxygen-layer distance enclosing a lithium layer in (111) direction (slab distance). The second parameter, the slab distance, is challenging to predict prior to the actual synthesis of a compound, as cation mixing upon charge-discharge cycling (i.e., the migration of metal cations to the lithium layer and vice versa) can dramatically reduce the slab distance and render a large fraction of lithium inaccessible. However, the first parameter, the oxidation state of face sharing cations, can be systematically controlled by introducing excess lithium to the compound, thereby effectively altering the stoichiometry to the general composition formula $Li_{1+x}M_yO_2$ (with lithium excess x). Excess lithium will lead to locally lithium-rich environments, in which lithium is the only face sharing species of tetrahedral sites (FIG. 4), resulting in low lithium diffusion barriers. If the lithium excess is sufficiently large, a percolating network of such easy pathways for Li hopping will be formed, and all lithium ions in this network will be accessible for extraction. FIG. 5 shows the number of accessible lithium ions per formula unit as a function of lithium excess as calculated in a numerical percolation simulation.

Figure 6:
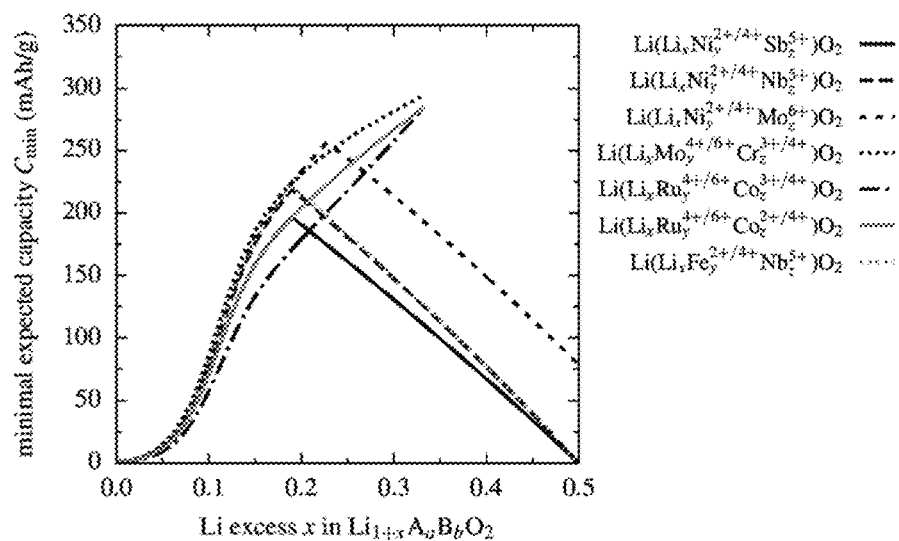
FIG. 6: Minimal expected specific capacity of the same set of compounds as in FIG. 3. The graph can be understood as a combination of the theoretical capacity depicted in FIG. 3 and the expected number of accessible lithium atoms of FIG. 5.

Combining the information about the available lithium contents, the accessible redox couples of species M, and the estimated number of accessible lithium atoms per formula unit allows calculating the minimal expected capacity $C_{min}$. The result for the same set of compounds as used in FIG. 3 is shown in FIG. 6. The real capacity of any active material is expected to lie within the region defined by $C_{min}(x)$ and $C_{max}(x)$ for any amount of lithium excess x. This estimator is a very powerful tool for the targeted synthesis of positive electrode active materials.

Note that the expected minimal capacity $C_{min}$ is insensitive with respect to cation mixing. Numerical calculations of the accessible lithium contents for varying degrees of cation mixing have shown that disorder even slightly increases the amount of accessible lithium.

EXAMPLES

Example 1

$Li_{1+x}Mo_{2x}Cr_{1-3x}O_2$, [0.15<x<0.333]

To prepare $Li_{1+x}Mo_{2x}Cr_{1-3x}O_2$, $Li_2CO_3$, $MoO_2$, and $Cr_3(OH)_2(OOCCH_3)_7$ were used as precursors. More than 5% excess $Li_2CO_3$ from the stoichiometric amount needed to synthesize $Li_{1+x}Mo_{2x}Cr_{1-3x}O_2$, [0<x<0.333] was used to compensate for possible Li loss during high temperature solid state reaction. The precursors were dispersed into acetone and ball-milled for 24 hours and dried overnight to prepare the precursor mixture. The mixture was fired at 1050° C. for 15 hours under Ar gas, and manually ground to obtain the final products.

Carbon coating can be applied 1) to prevent Mo and Cr dissolution, 2) to improve the cycling performance of $Li_{1+x}Mo_{2x}Cr_{1-3x}O_2$ by decreasing the particle size upon the carbon coating process, and 3) to improve electronic conductivity of the compounds. Sucrose ($C_{12}H_{22}O_{11}$) was used as a carbon precursor, and was mixed in a planetary ball-mill with $Li_{1+x}Mo_{2x}Cr_{1-3x}O_2$ in weight ratio between 90:10 and 70:30 of active material to sucrose. Then the mixture was annealed between 400° C. to 800° C. for 2 to 6 hours under Ar gas.

For electrochemical tests, Swagelok cells were assembled under Ar atmosphere in a glove box. For the cathode fabrication, ~70 wt % of the active compounds, ~20 wt % of carbon black, and ~10 wt % of PTFE binder were intimately mixed by hands or planetary ball-mill.

Figure 7:
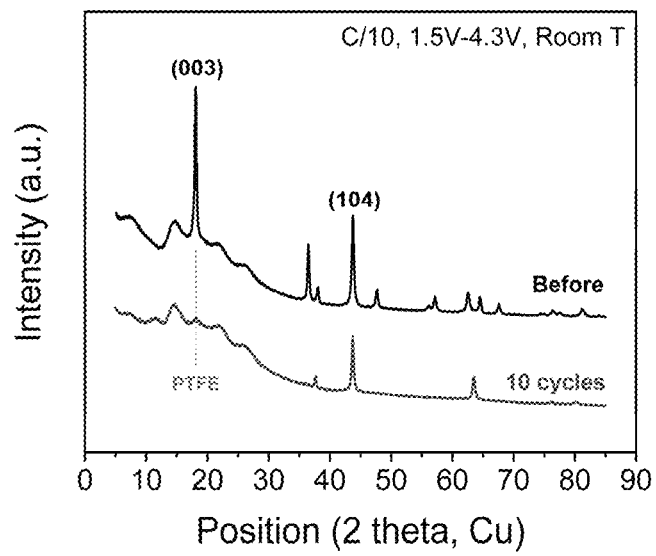
FIG. 7: XRD patterns of C-coated $Li_{1.211}Mo_{0.467}Cr_{0.3}O_2$ electrodes before and after 10 cycles, 1.5V-4.3V, C/10 (1C=327.486 $mAg^{-1}$)

The above compounds transform from a layered to a disorder rocksalt type lithium metal oxide by cation mixing during cycling. The XRD patterns in FIG. 7 show the structural evolution of the carbon-coated $Li_{1.233}Mo_{0.467}Cr_{0.3}O_2$ [x=0.233 in $Li_{1+x}Mo_{2x}Cr_{1-3x}O_2$] when cycled between 1.5 V-4.3 V at C/10 (1C=327.486 $mAg^{-1}$). A representative pattern of layered Li-TM-oxides is seen before cycling, and that of disordered Li-TM-oxides is seen after 10 cycles. The significant decrease in the intensity ratio of (003) peak to (104) peak, the measure of layeredness, indicates that cation mixing triggers the transformation from a layered to disordered rocksalt type lithium metal oxide.

Figure 8:
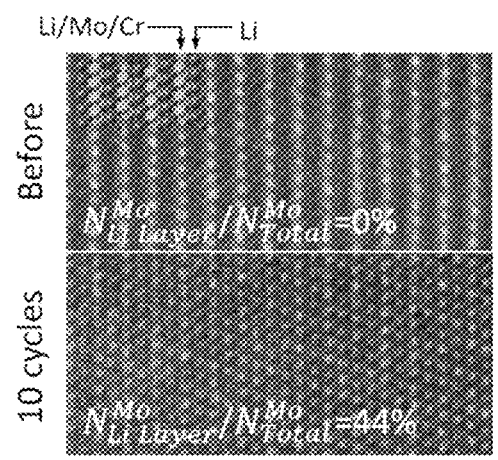
FIG. 8: The STEM along the [010] zone axis in a C-coated $Li_{1.211}Mo_{0.467}Cr_{0.3}O_2$ particle before and after 10 cycles, 1.5V-4.3V, C/20 (1C=327.486 $mAg^{-1}$).

In FIG. 8 the STEM image of the carbon-coated $Li_{1.233}Mo_{0.467}Cr_{0.3}O_2$ particle before cycling shows bright and dark columns corresponding to the atomic columns of ($Li^{4+}/Mo^{4+}/Cr^{3+}$)-ions and $Li^+$-ions, respectively. Z-contrast decreases dramatically after 10 cycles. This again indicates increased cation mixing. From Z-contrast information, we calculate 44% of Mo-ions to be in Li layers after 10 cycles at C/20. Together, XRD and STEM confirm that $Li_{1.233}Mo_{0.467}Cr_{0.3}O_2$ transforms from a layered to disordered Li-TM-oxide by cation mixing during cycling.

Figure 9:
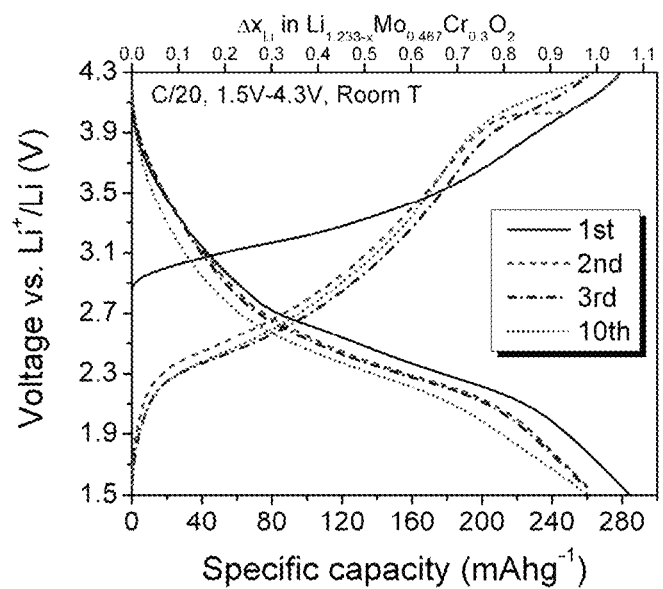
FIG. 9: The voltage profile of C-coated $Li_{1.211}Mo_{0.467}Cr_{0.3}O_2$ when cycled between 1.5V-4.3V at C/20-rate (1C=327.486 mAg$^{-1}$).

FIG. 9 shows the voltage profile of carbon-coated $Li_{1.233}Mo_{0.467}Cr_{0.3}O_2$ when cycled between 1.5 V-4.3 V at C/20. The profile changes after the $1^{st}$ charge, and shows a high reversible capacity at an average voltage of ~2.8 V [$1^{st}$ discharge=284 $mAhg^{-1}$ (1.07Li), $2^{nd}$ discharge=265 $mAhg^{-1}$(1Li), and $10^{th}$ discharge=262 $mAhg^{-1}$ (0.99Li)]. A voltage profile change indicates the structural evolution of an electrode material. Thus, the significant change in the profile after the $1^{st}$ charge is consistent with our XRD and STEM observations of heavy cation mixing in the $1^{st}$ cycle. The high capacity of carbon-coated $Li_{1.233}Mo_{0.467}Cr_{0.3}O_2$ is non-intuitive. It has been seen that cation-mixed layered and disordered Li-TM-oxides cycle poorly due to their small slab distance which limits Li diffusion.

Figure 10:
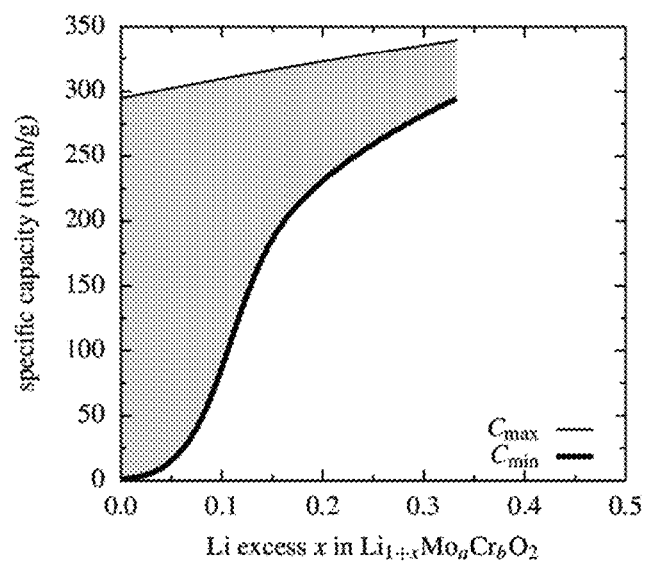
FIG. 10: Region of expected capacity for $Li(Li_xMo_aCr_b)O_2$. The specific capacity of an actual material is expected to fall into the region defined by the maximum theoretical capacity (FIG. 3) and the minimal expected capacity (FIG. 5).

FIG. 10 explains why such a high capacity could be achieved in disordered (cation-mixed) $Li_{1.233}Mo_{0.467}Cr_{0.3}O_2$. At x=0.233, the tetrahedral sites, face-sharing only lithium-ions, form a percolating network in a rock salt structure. The accessible lithium atoms by percolating network reach ~0.95Li when x=0.233, corresponding to 250 mAh/g for $Li_{1.233}Mo_{0.467}Cr_{0.3}O_2$ (FIG. 10).

Example 2

$Li_{1+x}Ni_{(2-4x)/3}M_{(1+x)/3}O_2$, [0.15<x≤0.3], M=Sb or Nb

To prepare $Li_{1+x}Ni_{(2-4x)/3}M_{(1+x)/3}O_2$ [M=Sb or Nb], $Li_2CO_3$, $NiCO_3$, and $Sb_2O_5$ (or $Nb_2O_5$) were used as precursors. More than 5% excess $Li_2CO_3$ from the stoichiometric amount needed to synthesize $Li_{1+x}Ni_{(2-4x)/3}M_{(1+x)/3}O_2$, [0<x≤0.3] was used to compensate for possible Li loss during high temperature solid state reaction. The precursors were dispersed into acetone and ball-milled for 24 hours and dried overnight to prepare the precursor mixture. The mixture was fired at 800° C. for 15 hours under $O_2$ gas, and manually ground to obtain the final products.

Carbon coating can be applied 1) to improve the cycling performance of $Li_{1+x}Ni_{(2-4x)/3}M_{(1+x)/3}O_2$ [M=Sb or Nb] by decreasing the particle size upon the carbon coating process, and 2) to improve electronic conductivity of the compounds. Sucrose ($C_{12}H_{22}O_{11}$) can be used as a carbon precursor, and was mixed in a planetary ball-mill with $Li_{1+x}Ni_{(2-4x)/3}M_{(1+x)/3}O_2$ [M=Sb or Nb] in weight ratio between 90:10 and 70:30 of active material to sucrose. Then the mixture can be annealed between 400° C. to 800° C. for 2 to 6 hours under $O_2$ gas.

For electrochemical tests, Swagelok cells were assembled under Ar atmosphere in a glove box. For the cathode fabrication, ~80 wt % of the active compounds, ~15 wt % of carbon black, and ~5 wt % of PTFE binder were intimately mixed by hands or planetary ball-mill.

Example 3

$Li_{1+x}Ni_{(3-5x)/4}Mo_{(1+x)/4}O_2$, [0.15<x≤0.3]

To prepare $Li_{1+x}Ni_{(3-5x)/4}Mo_{(1+x)/4}O_2$, $Li_2CO_3$, $NiCO_3$, and $MoO_2$ can be used as precursors. More than 5% excess $Li_2CO_3$ from the stoichiometric amount needed to synthesize $Li_{1+x}Ni_{(3-5x)/4}Mo_{(1+x)/4}O_2$ [0<x≤0.3] can be used to compensate for possible Li loss during high temperature solid state reaction. The precursors can be dispersed into acetone and ball-milled for 24 hours and dried overnight to prepare the precursor mixture. The mixture can be fired at 800° C. for 10 hours under $O_2$ gas, and manually ground to obtain the final products.

Carbon coating can be applied 1) to improve the cycling performance of $Li_{1+x}Ni_{(3-5x)/4}Mo_{(1+x)/4}O_2$ by decreasing the particle size upon the carbon coating process, and 2) to improve electronic conductivity of the compounds. Sucrose ($C_{12}H_{22}O_{11}$) can be used as a carbon precursor, and it can be mixed in a planetary ball-mill with $Li_{1+x}Ni_{(3-5x)/4}Mo_{(1+x)/4}O_2$ in weight ratio between 90:10 and 70:30 of active material to sucrose. Then the mixture can be annealed between 400° C. to 800° C. for 2 to 6 hours under $O_2$ gas.

For electrochemical tests, Swagelok cells can be assembled under Ar atmosphere in a glove box. For the cathode fabrication, ~80 wt % of the active compounds, ~15 wt % of carbon black, and ~5 wt % of PTFE binder can be intimately mixed by hands or planetary ball-mill.

$Li_{1+x}Ni_{(3-5x)/4}Mo_{(1+x)/4}O_2$ may exhibit the maximum capacity as shown in the dotted curve in FIG. 3, and the minimum capacity (determined by accessible lithium atoms per formula unit) as shown in the dotted curve in FIG. 5 if sufficient voltage can be applied within the voltage windows of electrolytes.

Example 4

$Li_{1+x}Ru_{2x}M_{1-3x}O_2$, [0.15<x<0.333], M=Co, Ni, Fe

To prepare $Li_{1+x}Ru_{2x}M_{1-3x}O_2$, $Li_2CO_3$, $RuO_2$, and $CoCO_3$, $NiCO_3$, $FeCO_3$ for M=Co, Ni, Fe, respectively, can be used as precursors. More than 5% excess $Li_2CO_3$ from the stoichiometric amount needed to synthesize $Li_{1+x}Ru_{2x}M_{1-3x}O_2$ [0<x<0.333] can be used to compensate for possible Li loss during high temperature solid state reaction. The precursors can be dispersed into acetone and ball-milled for 24 hours and dried overnight to prepare the precursor mixture. The mixture can be fired at 600° C. for 10 hours under $O_2$ gas, and manually ground to obtain the final products.

Carbon coating can be applied 1) to improve the cycling performance of $Li_{1+x}Ru_{2x}M_{1-3x}O_2$ by decreasing the particle size upon the carbon coating process, and 2) to improve electronic conductivity of the compounds. Sucrose ($C_{12}H_{22}O_{11}$) can be used as a carbon precursor, and it can be mixed in a planetary ball-mill with $Li_{1+x}Ru_{2x}M_{1-3x}O_2$ in weight ratio between 90:10 and 70:30 of active material to sucrose. Then the mixture can be annealed between 400° C. to 800° C. for 2 to 6 hours under $O_2$ gas.

For electrochemical tests, Swagelok cells can be assembled under Ar atmosphere in a glove box. For the cathode fabrication, ~80 wt % of the active compounds, ~15 wt % of carbon black, and ~5 wt % of PTFE binder can be intimately mixed by hands or planetary ball-mill.

$Li_{1+x}Ru_{2x}M_{1-3x}O_2$ [0<x<0.333] may exhibit the maximum capacity as shown in the dash-dotted curve in FIG. 3, and the minimum capacity (determined by accessible lithium atoms per formula unit) as shown in the dash-dotted curve in FIG. 5 if sufficient voltage can be applied within the voltage windows of electrolytes.

Example 5

$Li_{1+x}Fe_{1-y}Nb_yO_2$ (0.15<x≤0.3, 0<y≤0.3)

To prepare $Li_{1+x}Fe_{1-y}Nb_yO_2$ (0<x≤0.3, 0<y≤0.3), $Li_2CO_3$, $FeCO_3$, and $Nb_2O_5$ can be used as precursors. More than 5% excess $Li_2CO_3$ from the stoichiometric amount needed to synthesize $Li_{1.125}Fe_{0.7}Nb_{0.175}O_2$ can be used to compensate for possible Li loss during high temperature solid state reaction. The precursors can be dispersed into acetone and ball-milled for 24 hours and dried overnight to prepare the precursor mixture. The mixture can be fired at 600° C. for 10 hours under $O_2$ gas, and manually ground to obtain the final products.

Carbon coating can be applied 1) to improve the cycling performance of $Li_{1+x}Fe_{1-y}Nb_yO_2$ by decreasing the particle size upon the carbon coating process, and 2) to improve electronic conductivity of the compounds. Sucrose ($C_{11}H_{22}O_{11}$) can be used as a carbon precursor, and it can be mixed in a planetary ball-mill with $Li_{1+x}Fe_{1-y}Nb_yO_2$ in weight ratio between 90:10 and 70:30 of active material to sucrose. Then the mixture can be annealed between 400° C. to 800° C. for 2 to 6 hours under $O_2$ gas.

For electrochemical tests, Swagelok cells can be assembled under Ar atmosphere in a glove box. For the cathode fabrication, ~80 wt % of the active compounds, ~15 wt % of carbon black, and ~5 wt % of PTFE binder can be intimately mixed by hands or planetary ball-mill.

$Li_{1+x}Fe_{1-y}Nb_yO_2$ (0.15<x≤0.3, 0<y≤0.3) may exhibit the maximum capacity as shown in the dotted curve in FIG. 3 and the minimum capacity (determined by accessible lithium atoms per formula unit) as shown in the dotted curve in FIG. 5 if sufficient voltage can be applied within the voltage windows of electrolytes.

What is claimed is:

1. A lithium metal oxide characterized by a general formula $Li_xM_yO_2$ wherein 0.6≤y≤0.85, 0≤x+y≤2, and M being one or more of a metallic species chosen from the group consisting of Al, Ti, V, Cr, Mn, Fe, Co, Ni, Cu, Zn, Zr, Nb, Mo, Ru, Sn and Sb; wherein said oxide, as synthesized, has a random or partially random distribution of Li cations and M cations in the oxygen arrangement of the rock-salt structure, as measurable by XRD, wherein the lithium metal oxide has substoichiometric amount of lithium.

2. An electrode comprising a lithium metal oxide characterized by a general formula $Li_xM_yO_2$ wherein 0.6≤y≤0.85, 0≤x+y≤2, and M being one or more of a metallic species chosen from the group consisting of Al, Ti, V, Cr, Mn, Fe, Co, Ni, Cu, Zn, Zr, Nb, Mo, Ru, Sn and Sb; wherein said oxide, as synthesized, has a random or partially random distribution of Li cations and M cations in the oxygen arrangement of the rock-salt structure, as measurable by XRD.

3. A lithium battery comprising the electrode material of claim 2.

4. A device comprising the lithium battery of claim 3.

5. The device of claim 4, wherein the device is a portable electronic device, an automobile, or an energy storage system.

6. A lithium-ion cell comprising the electrode material of claim 2.

* * * * *